United States Patent
Corcos et al.

(10) Patent No.: US 8,957,379 B2
(45) Date of Patent: Feb. 17, 2015

(54) SUSPENDED WIDEBAND PLANAR SKIRT ANTENNA HAVING LOW THERMAL MASS FOR DETECTION OF TERAHERTZ RADIATION

(71) Applicant: International Business Machines Corporation, Armonk, NY (US)

(72) Inventors: Dan Corcos, Nesher (IL); Danny Elad, Moshav Liman (IL); Noam Kaminski, Kiryat tivon (IL); Bernhard Klein, Zürich (SZ); Lukas Kull, Zurich (SZ); Thomas Morf, Gross (SZ)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/663,508

(22) Filed: Oct. 30, 2012

(65) Prior Publication Data

US 2014/0117236 A1 May 1, 2014

(51) Int. Cl.
*G01J 5/02* (2006.01)
*G01J 5/20* (2006.01)
*G01J 5/08* (2006.01)
*H01Q 1/22* (2006.01)

(52) U.S. Cl.
CPC .............. *G01J 5/20* (2013.01); *G01J 5/0837* (2013.01); *H01Q 1/2283* (2013.01)
USPC ...................................... 250/341.1

(58) Field of Classification Search
CPC .......... G01J 5/0837; G01J 5/02; G01J 5/024; G01J 5/0235
USPC ....................... 250/338.1–338.5, 341.1–341.8
See application file for complete search history.

(56) References Cited

U.S. PATENT DOCUMENTS

| 8,354,642 B2 * | 1/2013 | Berger et al. ............... 250/338.4 |
| 2006/0231761 A1 | 10/2006 | Peytavit et al. |
| 2007/0278407 A1 | 12/2007 | Wood et al. |
| 2008/0251870 A1 | 10/2008 | Morf et al. |
| 2011/0315880 A1 | 12/2011 | Nemirovsky |

(Continued)

FOREIGN PATENT DOCUMENTS

WO 2011151756 12/2011

OTHER PUBLICATIONS

Sizov et al., "Reveiw: THz detectors," 2010, Progress in Quantum Electronics, vol. 34, pp. 278-347.*

(Continued)

*Primary Examiner* — Kiho Kim (57) ABSTRACT

A novel and useful THz radiation detector comprising a suspended wideband planar skirt antenna for achieving low thermal mass and high electrical performance. The antenna comprises only the perimeter or "skirt" of the antenna. The antenna has multiple loops where each loop comprises a conductor that covers the perimeter or skirt and includes multiple inner and outer arms. The total length of each loop has a length substantially one wavelength. One or more ports or load impedances are connected at the center of the antenna and shared by one or more loops. A thermal sensor detects the heat generated in the load resister and converts the heat energy to an electrical signal which is transmitted to read out circuitry via signal lines that run together with a holding arm. The holding arm functions as both a path for the read out signals as well as providing mechanical support for and effectively suspending the antenna.

24 Claims, 8 Drawing Sheets

(56) References Cited

U.S. PATENT DOCUMENTS

2012/0091342 A1* 4/2012 Berger et al. ............. 250/338.4
2013/0082345 A1* 4/2013 Corcos et al. ................. 257/467

OTHER PUBLICATIONS

Lobotka et al., "Antenna-coupled uncoold THz microbolometer based on micromachined GaAs and LSMO thin film," 2008, IEEE Sensors conference, pp. 604-607.*

Vitiello, M.S. et al., "Room Temperature Terahertz Detectors based on Semiconductor Nanowire Field Effect Transistors", Proc. SPIE 8268, Quantum Sensing and Nanophotonic Devices IX, 826829, Jan. 20, 2012.
Ouyang, Zhengbiao et al., "A Combined Cavity for High Sensitivity THz Signal Detection", Proceedings of SPIE—The International Society for Optical Engineering, vol. 6840, Nov. 12-14, 2007.
Constantine A. Balanis, "Antenna Theory: Analysis and Design", 2Nd Ed, publisher: Wiley India Pvt. Ltd., 2007.

* cited by examiner

SUSPENDED WIDEBAND PLANAR SKIRT ANTENNA HAVING LOW THERMAL MASS FOR DETECTION OF TERAHERTZ RADIATION

FIELD OF THE INVENTION

The present invention relates to the field of semiconductor imaging devices, and more particularly relates to a wideband planar skirt antenna having low thermal mass for detection of Terahertz (THz) radiation.

BACKGROUND OF THE INVENTION

THz radiation imaging is currently an exponentially developing research area with inherent applications such as THz security imaging which can reveal weapons hidden behind clothing from distances of ten meters or more; or medical THz imaging which can reveal, for example, skin cancer tumors hidden behind the skin and perform fully safe dental imaging. Constructing prior art THz detectors is typically a challenging endeavor since both radiation sources and radiation detectors are complex, difficult and expensive to make.

THz radiation is non-ionizing and is therefore fully safe to humans unlike X-ray radiation. THz imaging for security applications, for example, uses passive imaging technology, namely the capabilities of remote THz imaging without using any THz radiation source thus relying solely on the very low power natural THz radiation which is normally emitted from any room temperature body according to well-known black body radiation physics. Passive THz imaging requires extremely sensitive sensors for remote imaging of this very low power radiation. Prior art passive THz imaging utilizes a hybrid technology of superconductor single detectors cooled to a temperature of about 4 degrees Kelvin which leads to extremely complex (e.g., only the tuning of the temperature takes more than 12 hours before any imaging can take place) and expensive (e.g., $100,000 or more) systems. A detector is desirable that can be used to detect THz radiation and that has much lower potential cost compared with existing superconducting solutions. Passive THz imaging, however, requires three orders of magnitude higher sensitivity compared with passive infrared (IR) imaging, which is a challenging gap.

SUMMARY OF THE INVENTION

There is provided a novel and useful THz radiation detector comprising a suspended wideband planar skirt antenna for achieving low thermal mass and high electrical performance. The antenna comprises only the perimeter or "skirt" of the antenna. The antenna has multiple loops where each loop comprises a conductor (wire) that covers the perimeter or skirt and includes multiple inner and outer arms. The total length of each loop has a length substantially one wavelength. One or more ports or load impedances are connected at the center of the antenna and shared by one or more loops. A thermal sensor detects the heat generated in the load resister and converts the heat energy to an electrical signal which is transmitted to read out circuitry via signal lines that run together with a holding arm. The holding arm functions as both a path for the read out signals as well as providing mechanical support for and effectively suspending the antenna There is thus provided in accordance with the invention, an antenna for receiving terahertz (THz) radiation comprising a suspended planar skirt element supported by a substantially non-conductive holding arm, the skirt element comprising a plurality of loops and wherein the length of each the loop is substantially one wavelength.

There is also provided in accordance with the invention, an antenna for receiving terahertz (THz) radiation comprising a suspended planar skirt element supported by a substantially non-conductive holding arm, the skirt element comprising a plurality of loops, a planar conductor effectively functioning as a reflector located below the skirt element, and wherein the length of each the loop is substantially one wavelength.

There is further provided in accordance with the invention, a detector for detecting terahertz (THz) radiation comprising a suspended planar skirt element supported by a substantially non-conductive holding arm, the skirt element comprising a plurality of loops, wherein the length of each the loop is substantially one wavelength, one or more load impedances directly coupled to the skirt element and operative to convert the received THz radiation to thermal energy and a thermal sensor operative to generate an electrical signal in accordance with the heat generated by the one or more load impedances.

There is also provided in accordance with the invention, a detector for detecting terahertz (THz) radiation comprising a plurality of suspended planar loops adapted to follow the contour of a selected antenna shape resulting in a skirt element with a plurality of internal arms, the skirt element supported by a substantially non-conductive holding arm, one or more load impedances directly coupled to the skirt element and operative to convert the received THz radiation to thermal energy and a thermal sensor operative to generate an electrical signal in accordance with the heat generated by the one or more load impedances.

BRIEF DESCRIPTION OF THE DRAWINGS

The invention is herein described, by way of example only, with reference to the accompanying drawings, wherein.

DETAILED DESCRIPTION OF THE INVENTION

The invention provides a suspended wideband planar skirt antenna having low thermal mass for detection of Terahertz (THz) radiation. The skirt antenna pertains to the field of Terahertz (THz) wave imaging which is the visualization by detection of THz radiation being irradiated or reflected from objects in the imager's field of view. Apart from being a non-ionizing radiation, the wavelengths of the THz portion of the electromagnetic (EM) spectrum are able to penetrate through numerous things such as fog, clothing, packages, etc., enabling imaging with high resolution even by means of relatively small radiating aperture which is crucial in space constrained environments. These qualities make imaging in this part of the electromagnetic spectrum a prime candidate for use in security, surveillance, navigation, etc. systems.

Figure 1:
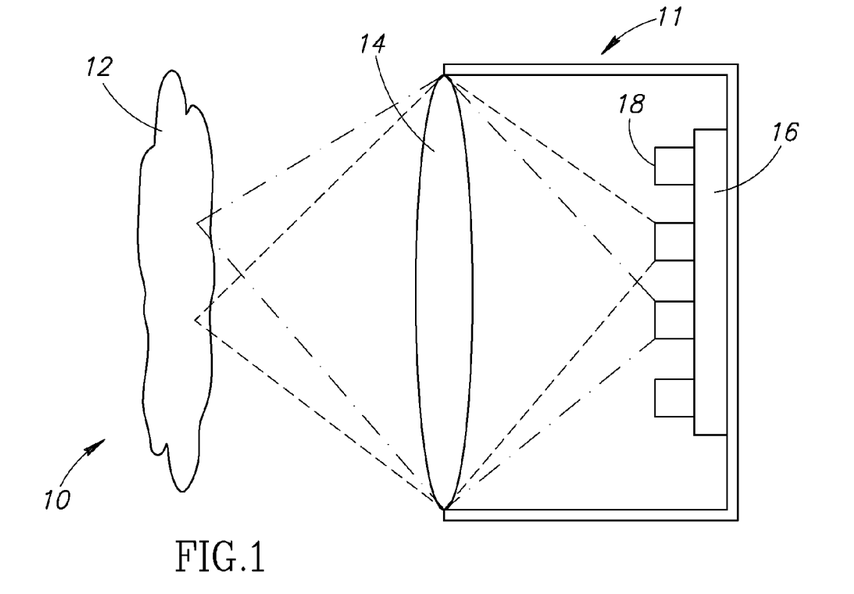
FIG. 1 is a diagram illustrating the structure of an example bolometer for detecting THz radiation.

A diagram illustrating the structure of an example bolometer for detecting THz radiation is shown in FIG. 1. The bolometer, generally referenced 10, comprises the body under test (BUT) 12, lens 14, housing 11, pixel array 18 and read out circuitry 16.

The detection of the THz radiation is performed by an antenna with a resistive load, directed at a specific pixel on the body under test (BUT). The antenna converts the THz electromagnetic energy into electrical current that heats the resistive load. The temperature change of this resistor is then measured as an indication of the temperature of the body under test (BUT).

The skirt antenna of the present invention enables a bolometer to achieve high sensitivity. In order to achieve high sensitivity, an efficient antenna design is provided which functions to collect the incident electromagnetic energy while at the same time has a very small thermal mass and heat capacitance in order to maximize the resistive element warm-up.

In one embodiment, a micro-electromechanical system (MEMS) based skirt antenna is provided exhibiting minimal thermal capacity that, with the aid of reflectors, forms a directive antenna.

Sensors at THz frequencies are typically bolometers, since electronics cannot reach these frequencies. Bolometers can be implemented using slightly modified CMOS techniques or using a CMOS SOI process with MEMS post processing. A THz sensor can be directly integrated with readout circuitry in a CMOS-SOI process. One sensor that can be used is an antenna coupled bolometer.

In one embodiment, a broadband antenna with a large thermal capacitance is connected to a load impedance (i.e. termination resistor or port) by a capacitive coupling through a vacuum gap. This physical separation provides thermal isolation to the resistor, which heats up considerably due to the low thermal capacitance. The THz sensor is realized with a temperature dependent resistor or with a FET where it's strongly temperature dependent subthreshold current is used as a sensor.

A bolometer based detector may take the form of a lens on the top of the structure to collect the incident electromagnetic energy of individual pixels. Each pixel is adapted to be thermally isolated from other pixels and from the entire structure. This is achieved by creating a vacuum around the bolometers. In order to increase the sensitivity of the bolometer, the noise is reduced by cooling the entire structure and the antenna down to cryogenic temperatures.

In one embodiment, a basic pixel can take the form of a spiral shaped antenna which performs well and has a wide bandwidth. The antenna is directly connected to a bolometer, which in this example embodiment, is a resistive gate Field-Effect-Transistor (FET). The temperature change of the transistor is sampled through the change in the transistor's current. The antenna and bolometer are separated from the rest of the structure using MEMS techniques to obtain the thermal isolation.

The spiral antenna solution, however, has relatively high thermal capacitance. The high thermal capacitance means that it takes a very long time in order to yield a significant temperature change in the sensor. Without the benefit of a MEMS process for separating the sensor from the bulk, the heat change due to the radiation is greatly reduced and the signal-to-noise ratio is unacceptably low.

In another embodiment, the pixel is implemented using MEMS technology where the metal antenna is replaced with a high resistance antenna. In this embodiment, the antenna does not have a resistive port and the heating is due to the currents in the antenna itself. The MEMS process separates the antenna from the rest of the structure and thus reduces its thermal capacitance and thermal conductivity to the heat sink such that its temperature change is larger. From an electrical point of view, the best way to absorb power is to use a high effective area antenna coupled to a perfectly matched port. The use of an antenna shaped resistive material, however, results in performance far from optimal.

In another embodiment, a suspended antenna and bolometer are constructed over a semiconductor substrate. This embodiment allows for thermal isolation of the bolometer without having to isolate it from the antenna by means of electrical capacitance. The antenna may comprise the well-known dipole antenna or double dipole antenna which has low thermal mass but exhibits poor electrical performance due to its narrow bandwidth.

The detector embodiments described supra suffer from both electrical and a thermal drawbacks. For example, considering an electrical capacitive coupling between the antenna and the resistor, a large enough capacitor must be used which is hard to achieve within a small area, thus limiting the electrical capacitive coupling efficiency. In addition, the requirement of a small vacuum gap significantly increases the complexity of the MEMS process.

To overcome these problems, the present invention provides a detector wherein the antenna is directly connected to the termination resistor (i.e. load impedance) while the combined thermal capacitance of the antenna remains low. A large thermal capacitance, combined with low thermal conductivity, inevitably results in long thermal time constants and hence in low frame rates for thermal sensors.

The antenna of the present invention provides a structure that exhibits both low thermal capacitance and high electrical performance while providing superior performance. The antenna is suitable for implementation in numerous detectors, as well as in any application that requires a low thermal mass. The antenna structure is small in terms of heat capacitance, but at the same time it has high volume from an electrical perspective.

In one embodiment, an antenna is provided that is low thermal mass while exhibiting wide bandwidth. The structure may function as an antenna as well as a bolometer, absorbing both linear polarizations (i.e. X and Y directions) with reduced thermal mass. Such an antenna may comprise a planar bow-tie antenna. A disadvantage of the bowtie antenna is its relatively high thermal mass due to the large metal planes.

Figure 2:
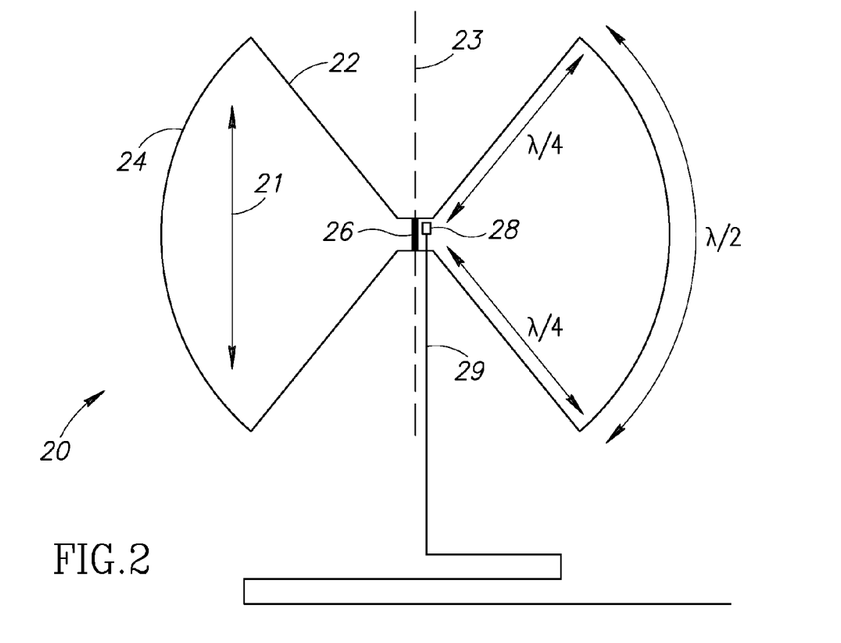
FIG. 2 is a diagram illustrating an example bow tie shaped skirt antenna in accordance with the present invention.

In another embodiment, an antenna with lower thermal mass is provided that has similar electrical performance. Such an antenna may comprise only the perimeter or "skirt" of the bow-tie antenna and is referred to as a skirt antenna. A diagram illustrating an example bow tie shaped skirt antenna in accordance with the present invention is shown in FIG. 2. The antenna, generally referenced 20, comprises two loops, including a left loop and a right loop. Each loop comprises a conductor that covers the perimeter or skirt of half the bow tie, including arms 22 and outer edge 24. The length of each loop including two arms 22 and outer edge or arc 24 have a length substantially one wavelength. In the example shown, each inner arm has a length of approximately one quarter wavelength while the outer edge (arc) has a length of approximately one half wavelength, yielding a total loop length of one wavelength. Note that the breakdown of the lengths of the individual components of the loop is not critical, only the total length is. A load resister 26 is connected at the center of the antenna and shared by both loops. A thermal sensor (e.g., transistor) 28 detects the heat generated in the load resister and converts the heat energy to an electrical signal which is transmitted to read out circuitry (not shown) via signal lines that run together with the holding arm 29. The holding arm functions as both a path for the read out signals as well as providing mechanical support for and effectively suspending the antenna. Note that a longer holding arm fabricated from a material having poor thermal conductivity (e.g., polysilicon) is preferable to maximize the thermal isolation between the antenna and the supporting substrate.

In the example provided, the antenna is constructed of metal wires of minimal width which are connected to a matched load of a 200 ohm load resistor. Note that one difference between the skirt antenna and a solid planar bow tie antenna is the excitation direction of the port. The antenna polarization is symbolized in doubled headed arrow 21 where the dashed line 23 indicates the symmetry plane separating the left and right loops of the antenna.

Figure 3:
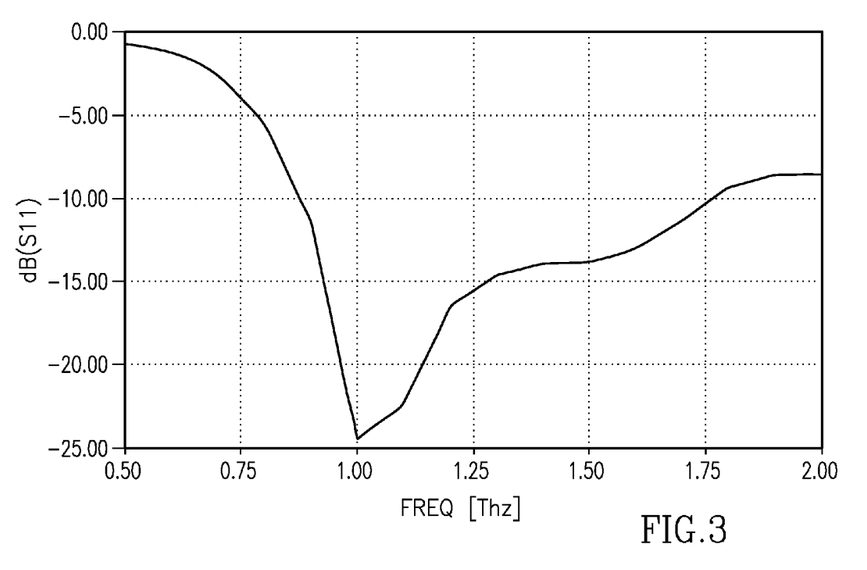
FIG. 3 is a graph illustrating the reflection coefficient (S11) of the example skirt antenna of FIG. 2.

The performance of the skirt antenna is verified in the following figures that depict the antenna parameters. In particular, a graph illustrating the reflection coefficient (S11) of the example skirt antenna of FIG. 2 is shown in FIG. 3. Shown is the S11 of the skirt antenna from a 200 ohm transmission line. The antenna exhibits a bandwidth of approximately 900 GHz (of S11 below −10 dB) around 1250 GHz, which is more than 70%.

Figure 4:
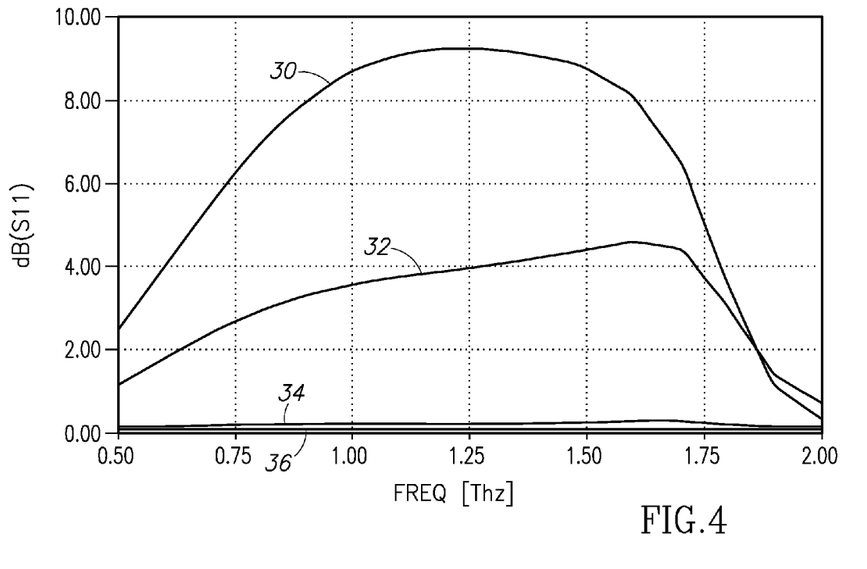
FIG. 4 is a graph illustrating the directivity of the example skirt antenna of FIG. 2.

A graph illustrating the directivity of the example skirt antenna of FIG. 2 is shown in FIG. 4. The directivity of the antenna is shown for the polarization as shown in FIG. 2 ($\phi=0°$), for different $\theta$ directions. Note that only the half plane of Z>0 (for 0<$\theta$<90 including 0 degrees in trace 30; 30 degrees in trace 32; 60 degrees in trace 34; and 90 degrees in trace 36) is shown since it is assumed that an infinite ground plane is placed at Z=$\lambda$/4 parallel to the antenna plane acting as a perfect reflector and thus canceling the far field radiation in the $\theta$>90° direction.

Figure 5A:
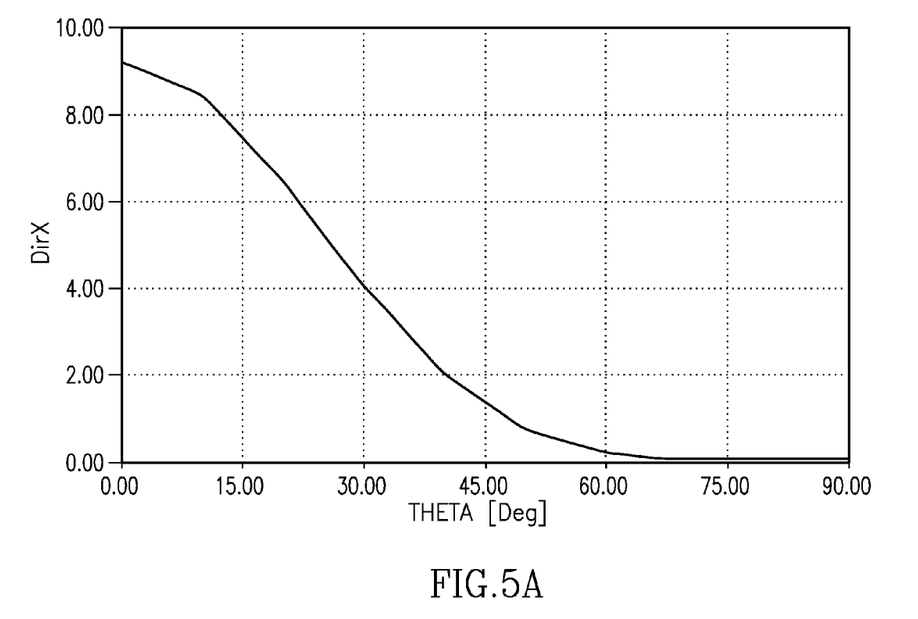
FIG. 5A is a graph illustrating the directivity at 1.3 THz of the example skirt antenna of FIG. 2.
Figure 5B:
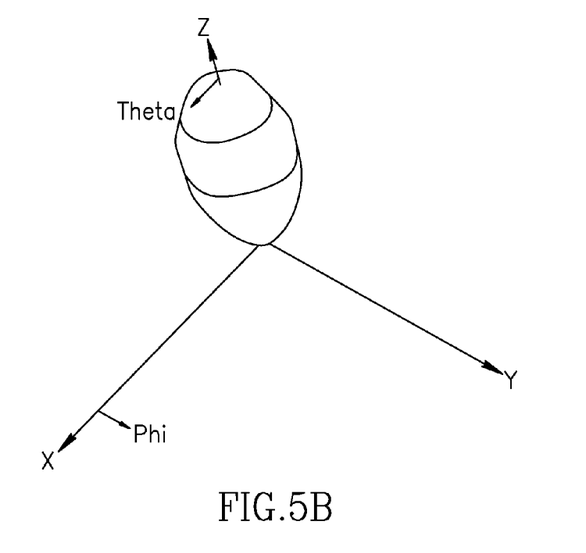
FIG. 5B is a graph illustrating the radiation pattern at 1.3 THz of the example skirt antenna of FIG. 2.

Another way of characterizing the antenna performance is through the radiation pattern. A graph illustrating the directivity at 1.3 THz of the example skirt antenna of FIG. 2 is shown in FIG. 5A. The radiation pattern shown is for 1300 GHz for $\phi=0°$. The 3 dB beam width at that frequency is 27°. A graph illustrating the 3D radiation pattern at 1.3 THz of the example skirt antenna of FIG. 2 is shown in FIG. 5B.

In order to create a skirt antenna capable of transmitting and receiving both linear polarizations, two antennas are used, such as shown in FIG. 2, rotated 90° respectively along the Z axis and connected to the same transmitter/receiver. This embodiment poses several difficulties, however. Firstly, the thermal capacity of such an antenna is double that of a single polarization antenna which is a critical disadvantage when the antenna functions as a bolometer. Secondly, the two perpendicular antenna would interact and interfere with each other, making the design more difficult than just duplicating and rotating the single polarization design.

Figure 6A:
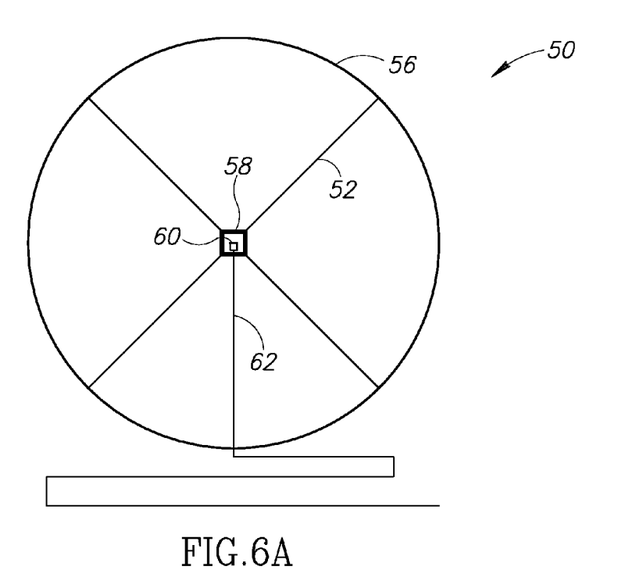
FIG. 6A is a diagram illustrating an example skirt antenna capable of dual polarization.

In order to overcome these difficulties the present invention provides an antenna structure having both polarizations but with less than double the thermal capacitance. This structure is also simpler to design once the single polarization antenna (such as of FIG. 2) is designed and characterized. A diagram illustrating an example skirt antenna capable of dual polarization is shown in FIG. 6A. The antenna, generally referenced 50, comprises a conducting wire in the shape of the outer rim of a wheel 56 and four inner conducting arms 52. Each arm is connected to two load resistors 58. The heat generated by the resistors is sensed by thermal sensor 60 and converted to an electrical signal transmitted along wires that travel with the holding arm 62. The holding arm provides mechanical support for the suspended antenna elements.

Figure 6B:
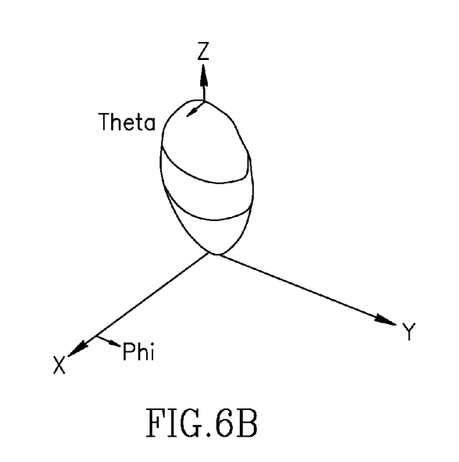
FIG. 6B is a graph illustrating the directivity in the X direction of the skirt antenna of FIG. 6A.
Figure 6C:
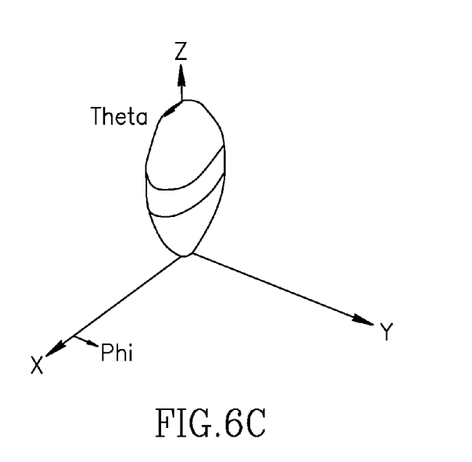
FIG. 6C is a graph illustrating the directivity in the Y direction of the skirt antenna of FIG. 6A.

The skirt antenna of FIG. 6A is constructed of an outer ring having a total length of two wavelengths with four inner wires, each having a length $\lambda$/4. The inner wires are terminated with four identical load resistors. When the antenna is excited by the horizontal (or vertical) polarization, the electrical current passes through the two horizontal (or vertical) resistors. A graph illustrating the directivity in the X direction of the skirt antenna of FIG. 6A is shown I FIG. 6B. A graph illustrating the directivity in the Y direction of the skirt antenna of FIG. 6A is shown in FIG. 6C. Note that in the case of vertically polarized incident radiation, most of the current is generated in the vertical resistors while almost no current is generated in the horizontal resistors. The current distribution on the outer ring includes null current on the vertical edges in agreement with symmetry rules.

Figure 7:
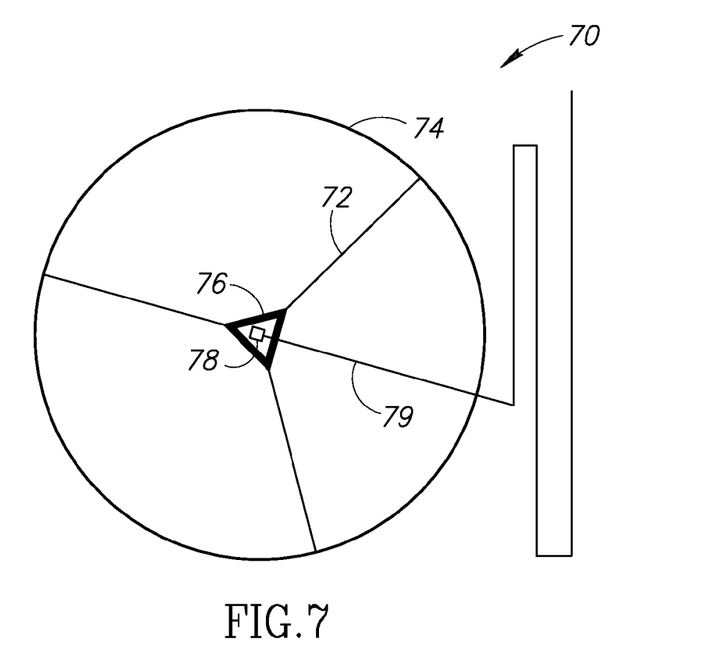
FIG. 7 is a diagram illustrating an example skirt antenna having three arms.

In an alternative embodiment of the dual polarization skirt antenna, three wires are used for arms instead of four. A diagram illustrating an example skirt antenna having three arms is shown in FIG. 7. The antenna, generally referenced 70, comprises an outer rim (i.e. wheel) conductive wire 74 and three inner arm conductive wires 72 connected to three load resistors 76, a thermal sensor transistor 78 and holding arm 79. This three arm, three resistor skirt antenna exhibits lower thermal capacitance than the four arm, four load resistor skirt antenna of FIG. 6A. Note, however, that the four wire skirt antenna has superior electrical performance over the three wire antenna, thus making the choice between the two antennas depend on engineering considerations for each individual implementation.

Figure 8:
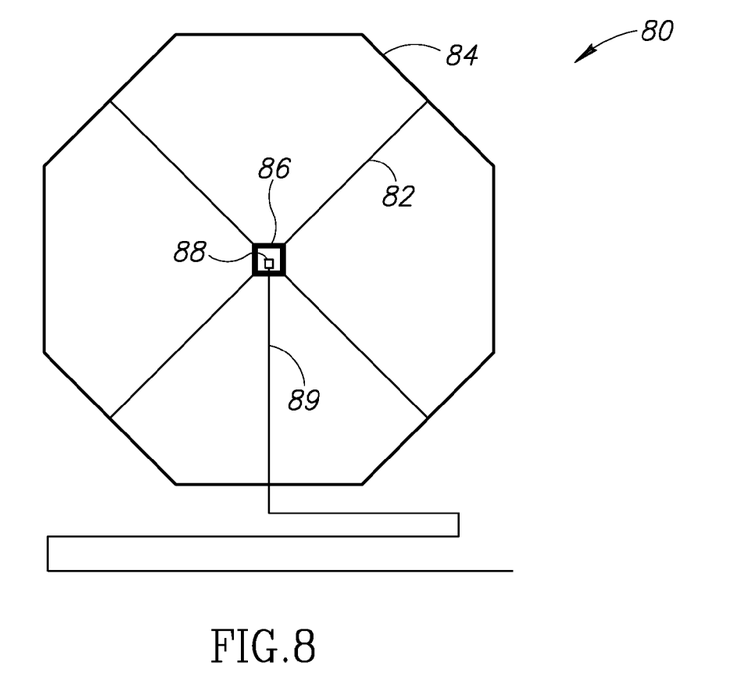
FIG. 8 is a diagram illustrating an example octagonal shaped skirt antenna having four arms.

Note that the skirt antenna may comprise additional shapes. A diagram illustrating an example octagonal shaped skirt antenna is shown in FIG. 8. The skirt antenna, generally referenced 80, comprises an octagonal shaped outer contour conductive wire 84, four inner conductive wire arms 82, four load resistors 86, thermal transistor sensor 88 and holding arm 89. Note that in this and other embodiments provided, it is not critical that the wire arms connect to the corners of the load resistors, as the connection may be along any part of the resistor. The length of the conductive wires is critical with the length of each of the four loops being one wavelength.

Figure 9:
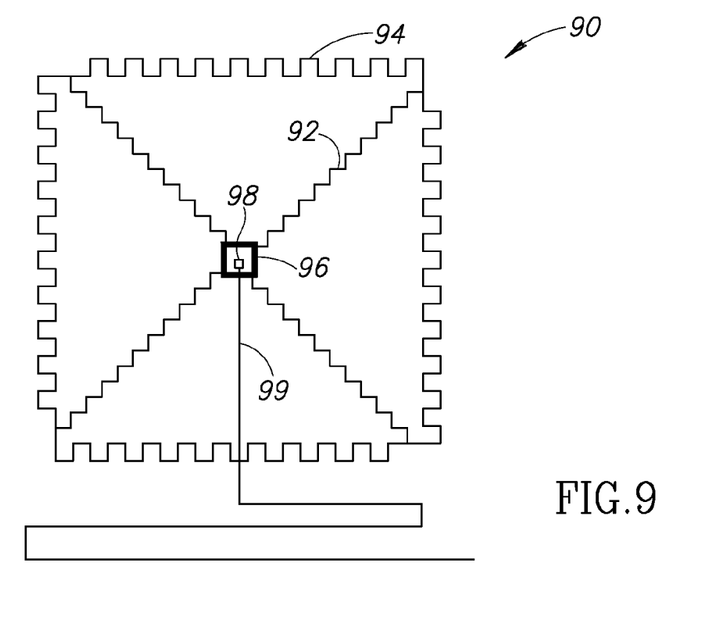
FIG. 9 is a diagram illustrating an example zigzag implemented skirt antenna having four arms.

A diagram illustrating an example zigzag implemented skirt antenna having four arms is shown in FIG. 9. The skirt antenna, generally referenced 90, comprises a zigzag conductive wire in the shape of a square or rectangle 94, four inner zigzag conductive wire arms 92, four load resistors 96, thermal transistor sensor 98 and holding arm 99. Note that the zigzag skirt antenna embodiment allows for a smaller footprint and is approximately twice smaller in volume that a non-zigzag antenna. As in previous embodiments, the length of the wire loops is critical, with their shape being far less critical. The smaller footprint of the zigzag skirt antenna yields electrical performance close to but not the same as its non-zigzag version.

Figure 10:
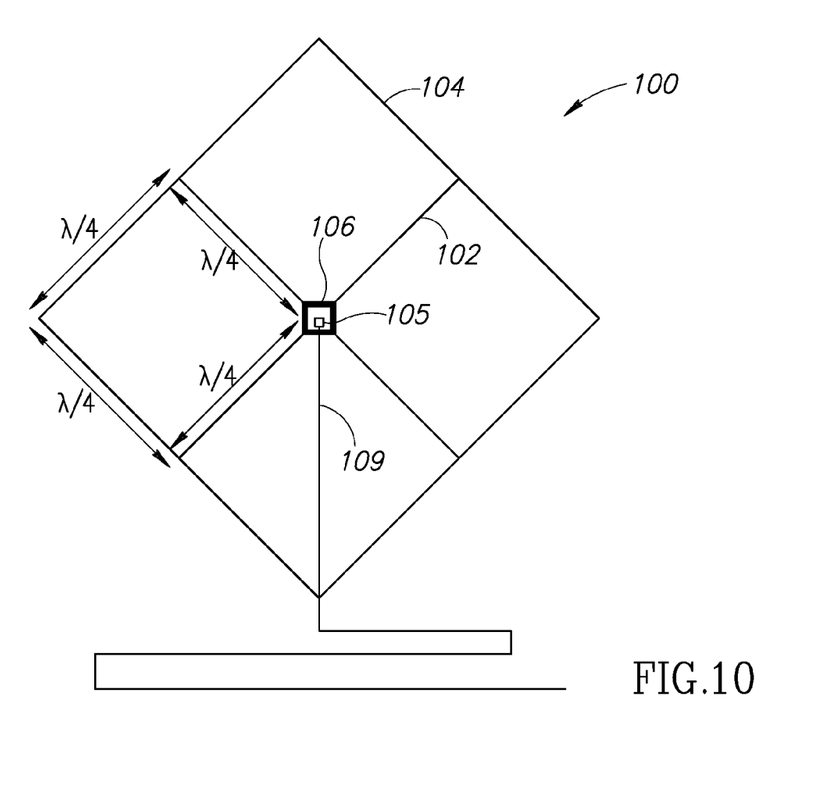
FIG. 10 is a diagram illustrating an example rectangular shaped skirt antenna having four arms.

A diagram illustrating an example rectangular shaped skirt antenna having four arms is shown in FIG. 10. The skirt antenna, generally referenced 100, comprises a conductive wire in the shape of a square or rectangle where the length of the inner arms 102 is substantially equal to the length of the outer arms 104, four load resistors 106, thermal transistor sensor 108 and holding arm 109. Note that the zigzag skirt antenna embodiment allows for a smaller footprint and is approximately twice smaller in volume that a non-zigzag antenna. As in previous embodiments, the length of the wire loops is critical, with their shape being far less critical. The length of the arms of each loop in the example antenna 100 adds up to substantially one wavelength. Thus, at 1 THz, the length of each arm is approximately $\lambda/4$.

The skirt antenna can be viewed as a traveling wave antenna. A brief overview of the principle of operation of the skirt antenna as a traveling wave antenna is provided below. The overview first describes the case of a single polarization antenna followed by the case of a dual polarization antenna.

Figure 11:
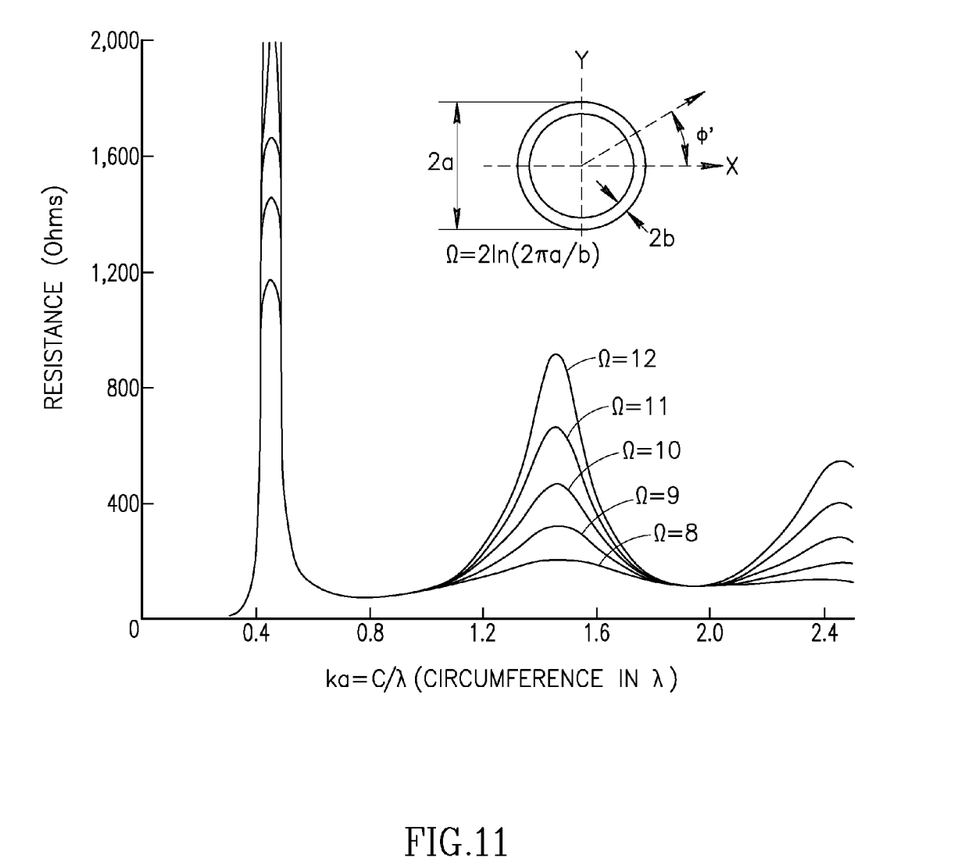
FIG. 11 is a diagram illustrating the input resistance of a loop antenna as a function of its perimeter length.

Consider the case of a loop antenna. The loop antenna is a standing wave antenna that resonates when its perimeter is equal to one wavelength (or any other whole multiple of a wavelength). The loop antenna is out of resonance (i.e. exhibiting infinite input impedance) at frequencies where its perimeter length is a multiple of one and a half wavelengths, e.g., 0.5, 1.5, etc. as shown in FIG. 11 which illustrates the input resistance of a loop antenna as a function of its perimeter length. Note that C represents the circumference, a represents the radius, b represents the thickness of the loop and k represents the wave number. It is desirable to minimize b in order to minimize the thermal capacitance. The peaks in the graph represent locations of excitation of the antenna and occur at multiples of 1.5 wavelengths.

Figure 12:
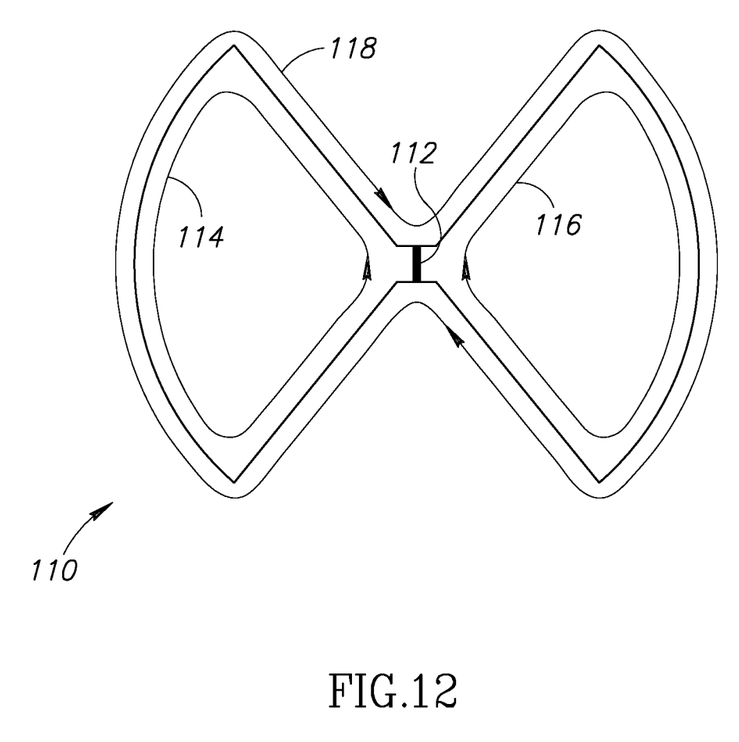
FIG. 12 is a diagram illustrating an example bowtie skirt antenna with different current paths.

As an example of the standing wave behavior of antenna, consider a conventional rectangular loop antenna (not the skirt antenna of the present invention) at a resonance frequency of one wavelength. The skirt antenna utilizes the loop antenna characteristics to form a wideband antenna by connecting two loops together. The resulting wideband antenna exhibits resonance even in frequencies where the loop antenna is out of resonance. The current in the skirt antenna flows in two paths, as shown in FIG. 12 for an example bowtie skirt antenna 110: (1) the first being identical to that of the loop antenna (i.e. encircling each loop 114, 116 separately while flowing through the port or load impedance 112), and (2) the second encircling the two loops together 118 without flowing through the port 112. An illustration of the different current paths is shown in FIG. 12. The first current path 114, 116 of the example skirt antenna 110 is related to a standing wave antenna while the second path 118 is related to a traveling wave antenna where the current can flow undisturbed whereby the null current points may be located anywhere along the path. At each frequency, the current distribution is the sum of the first and second paths.

Consider a bowtie skirt antenna with loop perimeter length of one wavelength. In this case, a single loop length is one wavelength and the length of two loops is two wavelengths, thus enabling resonances on both paths. The current distribution of such a skirt antenna, the result of the combination of the two current paths as shown in FIG. 12, exhibits characteristics of both standing waves and traveling waves. The nulls point locations shift along the antenna at different phase angles of the incident radiation at resonance frequency of one wavelength, suggesting a traveling wave mode. The radiation mechanism includes the formation of current flowing in the same direction at the left most and right most parts of the antenna, as well as in the port. Hence, this antenna radiates in the direction of the port.

Consider a bowtie skirt antenna with loop perimeter length of one and a half wavelength. In this case, a single loop length is one and a half wavelength and the length of two loops is three wavelengths, thus enabling resonances only on the two loops path. This case best demonstrates the traveling wave antenna principle, where a signal generated at an antenna port experiences an endless antenna with no reflections. Thus the best way of depicting the current distribution on the antenna is by traveling waves and not by standing waves.

The bowtie skirt antenna in this case shows this behavior. A signal generated by the port, travels along one of the loops, reaching the port again after traveling 1.5 wavelengths. Noting that a 1.5 wavelength long loop has infinite input impedance, the signal does not travel into the port, but rather continues to the other loop. Thus, although the loop perimeter is 1.5 wavelengths, the antenna does not have infinite impedance. The null points in the current distribution on the 1.5 wavelength skirt antenna change for different phases of the radiation suggesting there are multiple current paths rather than simply one.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. An antenna for receiving terahertz (THz) radiation, comprising: a suspended wire planar skirt element supported by a non-conductive holding arm, said skirt element comprising a plurality of loops; and wherein the length of each said loop is substantially one wavelength.

2. The antenna according to claim 1, wherein said skirt element comprises the perimeter of a bow-tie antenna forming two loops, the length of each loop being one wavelength.

3. The antenna according to claim 1, wherein said skirt element comprises a wheel shaped element having four spoke arms forming four loops, the length of each loop being one wavelength.

4. The antenna according to claim 3, wherein said wheel shaped element is adapted to receive electromagnetic radiation having linear polarization in either the X or Y directions.

5. The antenna according to claim 1, wherein said skirt element comprises a wheel shaped element having three spoke arms forming three loops, the length of each loop being one wavelength.

6. The antenna according to claim 1, wherein said skirt element comprises an octagonal shaped element having four arms forming four loops, the length of each loop being one wavelength.

7. The antenna according to claim 1, wherein said skirt element comprises a zigzag wired rectangular shaped element having four arms forming four loops, the length of each loop being one wavelength.

8. The antenna according to claim 1, wherein said skirt element comprises a square shaped element having four arms forming four loops, the length of each loop being one wavelength.

9. An antenna for receiving terahertz (THz) radiation, comprising: a suspended wire planar skirt element supported by a non-conductive holding arm, said skirt element comprising a plurality of loops; a planar conductor effectively functioning as a reflector located below said skirt element, and wherein the length of each said loop is substantially one wavelength.

10. The antenna according to claim 9, wherein said planar conductor is located approximately one quarter wavelength below said skirt element.

11. A detector for detecting terahertz (THz) radiation, comprising: a suspended wire planar skirt element supported by a non-conductive holding arm, said skirt element comprising a plurality of loops, wherein the length of each said loop is substantially one wavelength; one or more load impedances directly coupled to said skirt element and operative to convert said received THz radiation to thermal energy; and a thermal sensor operative to generate an electrical signal in accordance with the heat generated by said one or more load impedances.

12. The detector according to claim 11, wherein said plurality of reflectors comprises a planar conductor located below said skirt element.

13. The detector according to claim 12, wherein said planar conductor is located approximately one quarter wavelength below said skirt element.

14. The detector according to claim 11, wherein said skirt element comprises the perimeter of a bow-tie antenna forming two loops, the length of each loop being one wavelength.

15. The detector according to claim 11, wherein said skirt element comprises a wheel shaped element having four spoke arms forming four loops, the length of each loop being one wavelength.

16. The detector according to claim 15, wherein said wheel shaped element is adapted to receive electromagnetic radiation having linear polarization in either the X or Y directions.

17. The detector according to claim 11, wherein said skirt element comprises a wheel shaped element having three spoke arms forming three loops, the length of each loop being one wavelength.

18. The detector according to claim 11, wherein said skirt element comprises an octagonal shaped element having four arms forming four loops, the length of each loop being one wavelength.

19. The detector according to claim 11, wherein said skirt element comprises a zigzag wired rectangular shaped element having four arms forming four loops, the length of each loop being one wavelength.

20. The detector according to claim 11, wherein said skirt element comprises a square shaped element having four arms forming four loops, the length of each loop being one wavelength.

21. The detector according to claim 11, further comprising a readout circuit coupled to said thermal sensor.

22. A detector for detecting terahertz (THz) radiation, comprising: a plurality of suspended wire planar loops adapted to follow the contour of a selected antenna shape resulting in a skirt element with a plurality of internal arms, said skirt element supported by a non-conductive holding arm; one or more load impedances directly coupled to said skirt element and operative to convert said received THz radiation to thermal energy; and a thermal sensor operative to generate an electrical signal in accordance with the heat generated by said one or more load impedances.

23. The detector according to claim 22, wherein the length of each said suspended planar loop is substantially one wavelength.

24. The detector according to claim 22, further comprising a readout circuit coupled to said thermal sensor.

* * * * *